Jan. 16, 1951 N. C. MOORE 2,538,625
SPEED CHANGING TRANSMISSION
Filed Nov. 6, 1948 4 Sheets-Sheet 1

INVENTOR
N.C. MOORE
BY
W. Parnell
ATTORNEY

Jan. 16, 1951 N. C. MOORE 2,538,625
SPEED CHANGING TRANSMISSION
Filed Nov. 6, 1948 4 Sheets-Sheet 2

INVENTOR
N. C. MOORE
BY
ATTORNEY

Jan. 16, 1951 N. C. MOORE 2,538,625
SPEED CHANGING TRANSMISSION
Filed Nov. 6, 1948 4 Sheets-Sheet 3

INVENTOR
N.C. MOORE
BY
W.C. Parnell
ATTORNEY

Jan. 16, 1951  N. C. MOORE  2,538,625
SPEED CHANGING TRANSMISSION
Filed Nov. 6, 1948  4 Sheets-Sheet 4

INVENTOR
N. C. MOORE
BY
W C Parnell
ATTORNEY

Patented Jan. 16, 1951

2,538,625

UNITED STATES PATENT OFFICE 2,538,625

SPEED CHANGING TRANSMISSION

Norman C. Moore, Greenfield, Mass., assignor to Western Electric Company, Incorporated, New York, N. Y., a corporation of New York Application November 6, 1948, Serial No. 58,753

2 Claims. (Cl. 74—354)

This invention relates to speed changing transmissions and has for its object, the provision of a speed changing transmission which is compact in form and readily operable to convert a given input speed to any one of a multiplicity of different output speeds.

Speed change transmissions have been found desirable for use in the art of winding coils for communication systems. In the communication arts, coils of various types are employed and one of the variations lying namely in the sizes of the wires employed in the construction of these coils. Coil winding machines have been provided with arbors rotating at given speeds to wind coils thereon. These machines also include distributing arms for each wire being wound into a coil on the arbor, it being required in most instances that the convolutions of the wires forming the coils be positioned closely adjacent each other. Therefore, when there are variations in the sizes of the wires forming the coils, it is apparent that there must be fine variations in the driving means for the distributor arms to accurately lay the convolutions of the wires closely adjacent each other on the mandrel. Heretofore these adjustments for the various gages of wire have required considerable time in setting up each machine whenever wires of different sizes were to be wound into coils thereon.

With the aforementioned object in view, the invention comprises a speed changing transmission including an input shaft rotatable at a given speed, an output shaft rotatable at predetermined variable speeds from the given speed of the input shaft, a train of gears driven by the input shaft at successively varying rates of speeds from the given speed of the input shaft, connecting units for the gears in the train of gears to singly form operative connections thereof with the output shaft, and means to selectively move anyone of the connecting units into operative connection with its respective gear in the train of gears.

Specifically, the transmission includes a selector in the form of a drum having recesses disposed at variable positions about its periphery and throughout its length to singly receive projections of connecting units disposed in groups upon both sides of the selector and the gear and pinion units. The connecting units are divided into two groups and mounted upon parallel shafts having beveled gears on like ends thereof interengaging beveled gears on the output shaft whereby the driving or either of the parallel shafts of the connecting units will drive the output shaft at a given speed depending upon which connecting unit is moved into operating position, connecting its respective gear and pinion unit to the output shaft. Springs are provided to normally urge the connecting units into operative engagement with their respective gears of the gear and pinion units, but are held out of engagement by the selector which allows operative movement of only one connecting unit at a time. The selector is rotatable by a hand crank in any one of the operating positions determined by a pointer movable with the crank relative to a dial.

Other objects and advantages will be apparent from the following detailed description when considered in conjunction with the accompanying drawings, wherein Fig. 1 is a vertical sectional view of the transmission;

Figure 1:
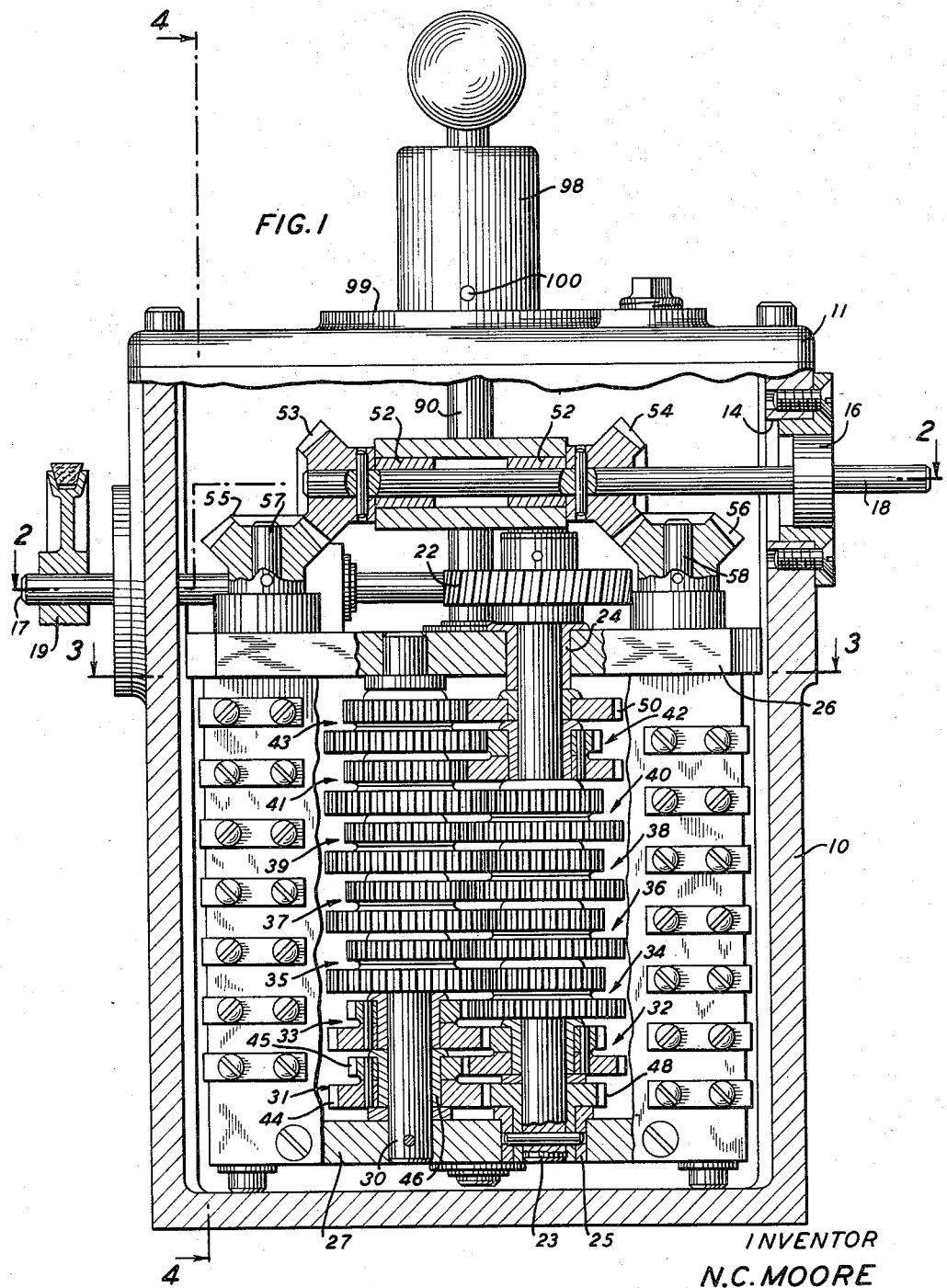
Figure 2:
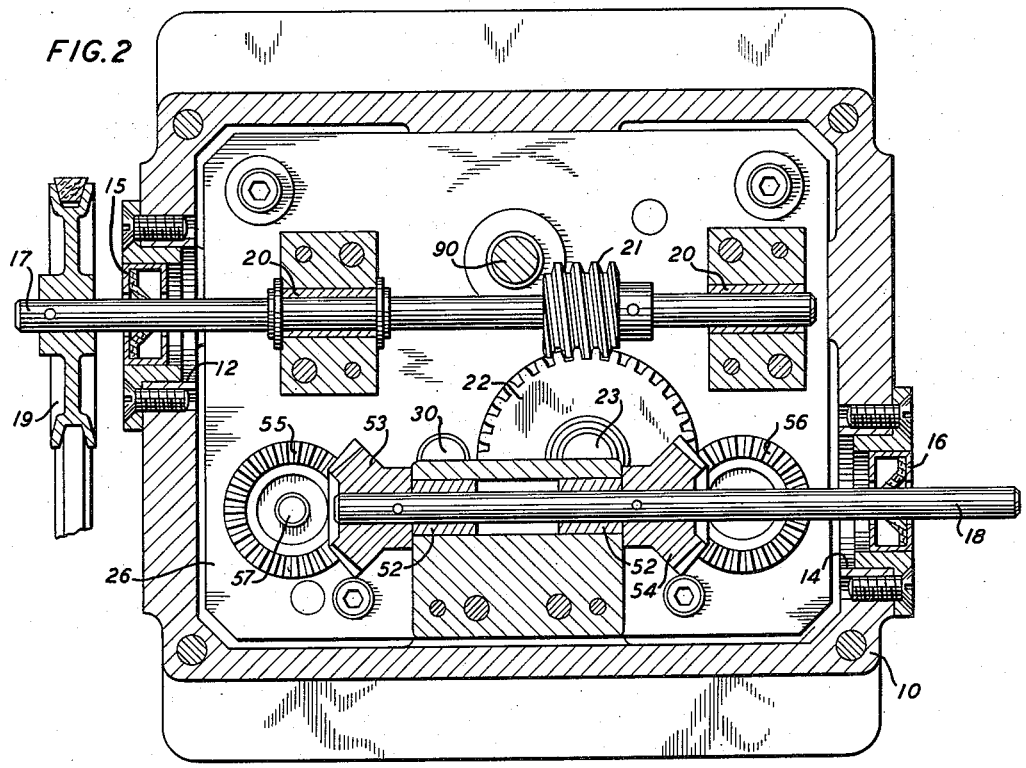
Fig. 2 is a horizontal sectional view taken substantially along the line 2—2 of Fig. 1.
Figure 6:
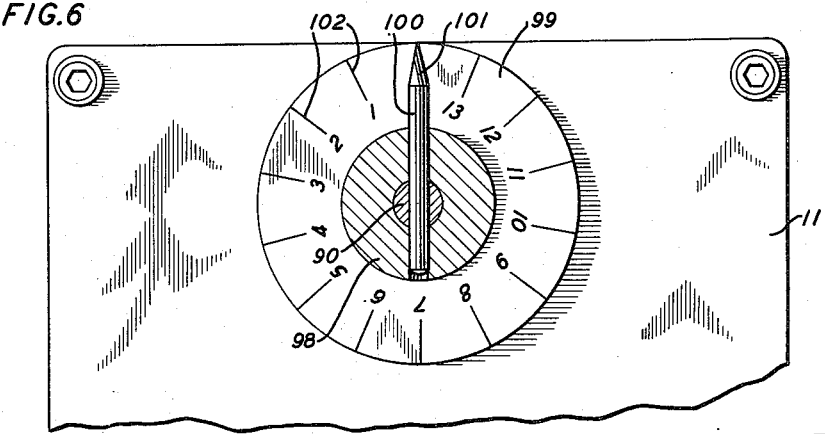
Fig. 6 is a fragmentary sectional view illustrating the pointer and dial associated with the selector.

Referring now to the drawings, the transmission includes a housing 10, having its open upper end closed by a cover 11, and apertures 12 and 14 in the sides thereof to receive sealing units 15 and 16 through which an input shaft 17 and an output shaft 18 respectively extend. The input shaft 17 is driven at a given constant speed by suitable means such as a belt and pulley connection 19 with a power source (not shown). The input shaft is journalled in bearings 20 mounted within the housing 10 and has a worm 21, interposed between the bearings, fixedly mounted thereon. A worm gear 22 interengaging the worm 21 and driven thereby is fixedly mounted on one end of a rotatable shaft 23 suitably journalled in bearings 24 and 25 of parallel frame members 26 and 27 suitably mounted in the housing 10. A fixed position shaft 30 has its ends disposed in apertures in the frame members 26 and 27 with its axis parallel with the axis of the rotatable shaft 23.

A plurality of gear and pinion units 31 to 43, inclusive, are mounted for free rotation on the shafts 23 and 30, the units 32, 34, 36, 38, 40 and 42 being mounted upon the rotatable shaft 23, while the other units are mounted for free rotation on the fixed shaft 30. These units are identical in structure, each including a gear 44 and a pinion 45 pinned to each other and mounted upon a bearing 46 disposed concentric with their respective shafts. A pinion 48 is pinned or otherwise fixed to the rotatable shaft 23 and interengages the gear 44 of the first unit 31. Therefore, during rotation of the rotatable shaft 23, the pinion 48 will drive the first unit 31 by rotating its gear 44 causing its pinion to rotate the second unit 32 at a lower speed while the second unit 32 through the connection of its pinion with the gear of the third unit 33 will rotate the third unit at a still lower speed and so on throughout the train of gears or units 31 to 43, inclusive. The last unit 43 has its pinion 45 interengaging a single unit or gear 50.

Figure 3:
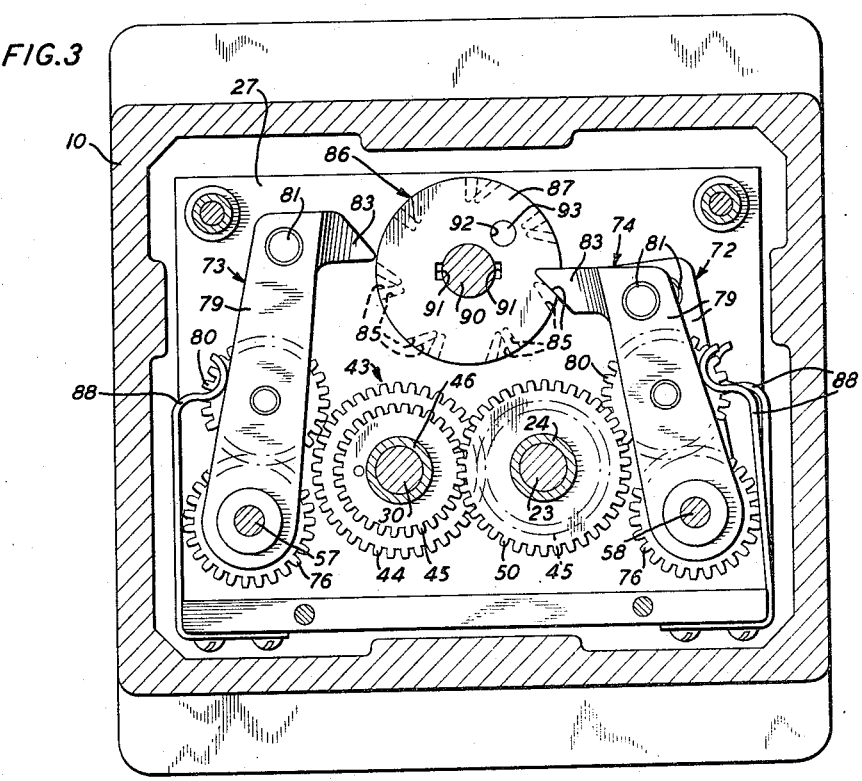
Fig. 3 is a horizontal sectional view taken along the line 3—3 of Fig. 1.
Figure 5:
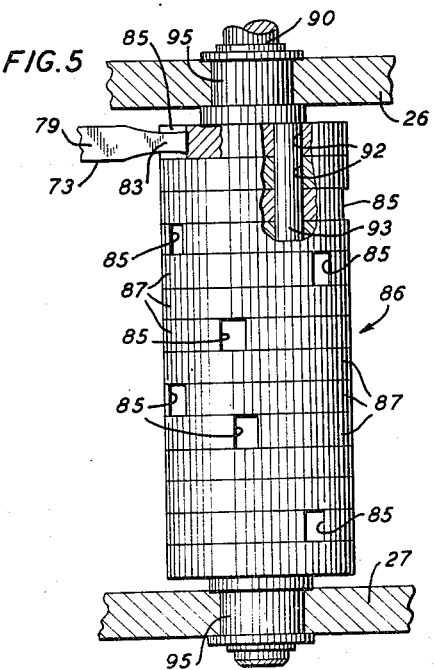
Fig. 5 is a fragmentary sectional view illustrating the selector.
Figure 4:
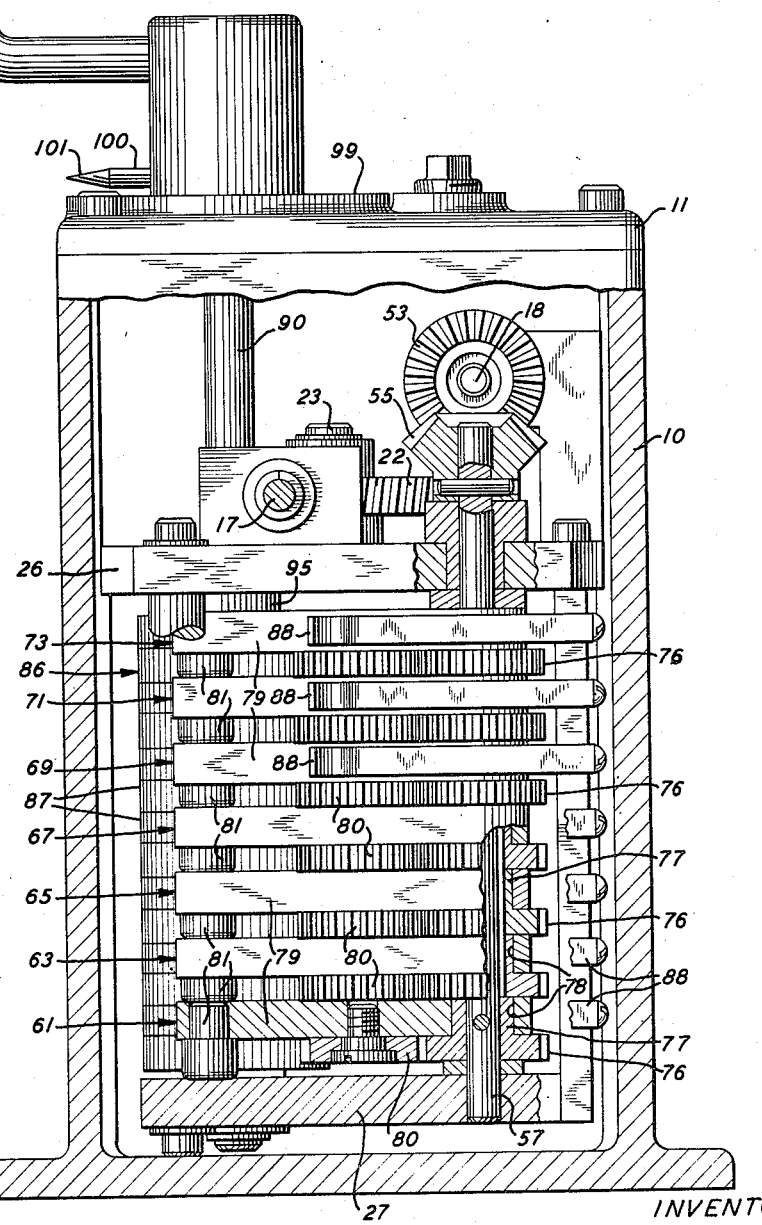
Fig. 4 is another vertical sectional view taken substantially along the line 4—4 of Fig. 1.

The output shaft 18 is journalled in bearings 52 and has beveled gears 53 and 54 mounted thereon upon opposite sides of the bearings 52. The beveled gears 53 and 54 respectively interengage beveled gears 55 and 56 of parallel shafts 57 and 58 which are journalled in suitable bearings in the parallel frames 26 and 27. The shafts 57 and 58 support connecting units, one for each gear of the units 31 to 43, inclusive, and the unit or gear 50. In the present embodiment of the invention, there are fourteen units providing fourteen variations in the speed of rotation of the output shaft 18 from the given speed of the input shaft 17. The connecting units may be identified by reference numerals 61 to 74, inclusive, corresponding to the gear and pinion units 31 to 43, inclusive, and gear 50. The connecting units are each provided with a gear 76 mounted upon its respective shaft 57 or 58 and having an annular portion 77 (Fig. 4) positioned in an aperture 78 of its leverlike member 79 to pivotally support this member for movement about the axis of its shaft. An idler gear 80 of each connecting unit, interengages its gear 76 and is positioned to be moved into engagement with its respective gear 44 of the gear and pinion units. Spacers 81 are carried by the outer ends of the leverlike members 79, the lowermost spacer in Fig. 4 engaging the horizontal member 27 and the succeeding spacing members engaging their adjacent leverlike members as illustrated in Fig. 4. The free ends 83 of the leverlike members 79 are pointed as illustrated in Fig. 3 to be received in their respective notches 85 of a selector 86.

The selector 86 is composed of a plurality of annular elements 87 equal in number to the connecting units 61 to 74, inclusive, and having their recesses 85 disposed in an out-of-aligned arrangement, preferably in a substantially spiral path about the periphery of the selector whereby only one connecting unit may be allowed to move into operative engagement with the driving means at one time. The elements 87 are centrally apertured to receive a crank shaft 90. Slots 91 are provided in the elements whereby they may be keyed to the crank shaft and aligned apertures 92 are formed therein to receive a pin 93 whereby the recesses 85 of the elements 87 will be positioned accurately with respect to each other.

The crank shaft 90 is journalled in suitable bearings 95 in the horizontal frame members 26 and 27 and extends upwardly through the cover 11 where a hand crank 98 is mounted on the upper end thereof. An annular dial 99 mounted at a fixed position on the cover 11, concentric with the crank shaft 90 is divided by graduations into fourteen equal parts and numbered accordingly to indicate the fourteen speeds or operating positions for the transmission. A pin 100 extending through aligned apertures in the hand crank 98 and the crank shaft 90 has a pointed end 101 to register with any of the indications 102 on the dial 99.

Considering now the operation of the speed changing transmissions, let it be assumed that the input shaft 17 is driven constantly at a given speed. It is possible in the present embodiment of the invention to drive the output shafts 18 at any one of fourteen known speeds slower than the speed of the input shaft 17. If the operator moves the hand crank 98 counterclockwise, until the pointer registers with the first indication 102, the selector 86 will be moved until the notch 85 in the first selector element at the bottom of the selector is positioned to allow the connecting unit 61 to move into operative connection with the gear 44 of the unit 31. The spring 88 backing the connecting unit 71 forces the intermediate gear 80 of this unit into engagement with the gear 44 of the unit 31, thus forming a positive driving connection between the input shaft 17 and the output shaft 18. This driving connection may be traced from the input shaft 17 through the worm 21, worm gear 22, shaft 23, pinion 48, gear 44 of unit 31, gears 76 and 80 of the connecting unit 61, shaft 57 and beveled gears 55 and 53 to the output shaft 18. This driving connection is maintained until it is desirable to drive the output shaft at a different speed at which time the selected speed will be determined and the hand crank moved until the pointer 101 registers with the desired indication on the dial 99. This change in speed may take place during the continued operation of the input shaft 17.

It will be noted that during one complete rotation of the crank shaft 90, the selector 86 will be rotated one revolution to successively position the recesses 85 of their elements 87 into registration with the connecting elements 61 to 74, respectively, thus successively selecting the dimensioning speeds of the gear and pinion units 31 to 43, inclusive, and to gradually decrease the speed of rotation of the output shaft 18 from its fastest speed when connected with the unit 31 to its slowest speed when connected to the unit 50. These driving connections are so arranged through the control of the selector 86 that during its rotation, to change from one driving connection to another, the connecting unit which has been in operative position, is moved out of operative position or disconnected from the train of gears, prior to the movement of the next connecting unit into operative position. Furthermore, with the present arrangement, the shafts 57 and 58 are alternately utilized in that the connecting units are divided into two groups similar to the arrangement of their respective gear and pinion units.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A speed changing transmission comprising an input shaft rotatable at a given speed, a rotatable shaft, means operatively connecting the rotatable shaft with the input shaft to be driven at a constant known speed thereby, a fixed position shaft mounted parallel with the rotatable shaft, gear and pinion units mounted for free rotation upon the parallel rotatable and fixed position shafts and interconnected whereby the gear of the first unit on one of the parallel shafts will, when rotated, cause its pinion to rotate the gear of the companion unit of the other parallel shaft and so on throughout the length of the intermeshing train of gears and pinions to and including the last unit, a pinion fixedly mounted for rotation with the rotatable shaft to drive the gear of the first unit to cause rotation of the units at varying speeds, an output shaft, intermediate shafts operatively connected to the output shaft, series of connecting units supported by their respective intermediate shafts for singly operatively connecting their respective gear and pinion units and intermediate shafts, and a drum-like selector to normally hold the connecting units out of connection with their gear and pinion units and having out-of-aligned recesses to effect selective movement of the connecting units into engagement with their gear and pinion units.

2. A speed changing transmission comprising an input shaft rotatable at a given speed, a rotatable shaft, means operatively connecting the rotatable shaft with the input shaft to be driven at a constant known speed thereby, a fixed position shaft mounted parallel with the rotatable shaft, gear and pinion units mounted for free rotation upon the parallel rotatable and fixed position shafts and interconnected whereby the gear of the first unit on one of the parallel shafts will, when rotated, cause its pinion to rotate the gear of the companion unit of the other parallel shaft and so on throughout the length of the intermeshing train of gears and pinions to and including the last unit, a pinion fixedly mounted for rotation with the rotatable shaft to drive the gear of the first unit to cause rotation of the units at varying speeds, an output shaft, intermediate shafts operatively connected to the output shaft, series of connecting units supported by their respective intermediate shafts for singly operatively connecting their respective gear and pinion units and intermediate shafts, each connecting unit including a fixed gear mounted on its intermediate shaft, an intermediate gear interconnected with the fixed gear, an arm to support the intermediate gear mounted for movement relative to its intermediate shaft and having a projection adjacent its outer end, means normally urging each arm toward its gear and pinion unit, and a drum-like selector to normally hold the connecting units unoperated and having out-of-aligned recesses to singly receive the projections during rotation of the selector whereby any of the connecting units may effect connection between the input and output shafts to cause the output shaft to be driven at known variable speeds.

NORMAN C. MOORE.

REFERENCES CITED

The following references are of record in the file of this patent:

UNITED STATES PATENTS

| Number | Name | Date |
| --- | --- | --- |
| 296,491 | West | Apr. 8, 1894 |
| 829,068 | Fox | Aug. 21, 1906 |
| 872,952 | Markgraf | Dec. 3, 1907 |
| 2,311,031 | De Lancey | Feb. 16, 1943 |
| 2,377,305 | Bickel | June 5, 1945 |

FOREIGN PATENTS

| Number | Country | Date |
| --- | --- | --- |
| 334,216 | France | Dec. 15, 1903 |
| 887,628 | France | Nov. 18, 1943 |